US012302925B2

(12) United States Patent
Schweizer et al.

(10) Patent No.: US 12,302,925 B2
(45) Date of Patent: May 20, 2025

(54) PREPARATION OF ACID SOLUBLE PULSE PROTEIN HYDROLYZATES WITH LITTLE OR NO ASTRINGENCY AND PULSE PROTEIN HYDROLYZATES OF IMPROVED AMINO ACID SCORE

(71) Applicant: Burcon NutraScience (MB) Corp., Winnipeg (CA)

(72) Inventors: Martin Schweizer, Winnipeg (CA); Brandy Gosnell, Winnipeg (CA); Randy Willardsen, Roseville, CA (US); Sarah Medina, Winnipeg (CA); Kevin Segall, Winnipeg (CA)

(73) Assignee: Burcon NutraScience (MB) Corp., Winnipeg (CA)

(*) Notice: Subject to any disclaimer, the term of this patent is extended or adjusted under 35 U.S.C. 154(b) by 386 days.

(21) Appl. No.: 15/911,706

(22) Filed: Mar. 5, 2018

(65) Prior Publication Data

US 2018/0289037 A1    Oct. 11, 2018

Related U.S. Application Data

(60) Provisional application No. 62/466,581, filed on Mar. 3, 2017.

(51) Int. Cl.
| | |
|---|---|
| A23J 3/14 | (2006.01) |
| A23J 1/14 | (2006.01) |
| A23J 3/30 | (2006.01) |
| A23J 3/34 | (2006.01) |
| A23L 2/39 | (2006.01) |
| A23L 2/66 | (2006.01) |
| A23L 5/00 | (2016.01) |
| A23L 33/18 | (2016.01) |
| A23L 33/185 | (2016.01) |

(52) U.S. Cl.
CPC ........... *A23J 3/346* (2013.01); *A23J 1/14* (2013.01); *A23J 3/14* (2013.01); *A23J 3/30* (2013.01); *A23J 3/34* (2013.01); *A23L 2/39* (2013.01); *A23L 2/66* (2013.01); *A23L 5/55* (2016.08); *A23L 33/18* (2016.08); *A23L 33/185* (2016.08)

(58) Field of Classification Search
CPC ...................................... A23J 3/346
See application file for complete search history.

(56) References Cited

U.S. PATENT DOCUMENTS

| | | | | |
|---|---|---|---|---|
| 5,520,935 A | * | 5/1996 | Eriksen ................. | A23J 3/346 |
| | | | | 426/44 |
| 2008/0226810 A1 | | 9/2008 | Passe | |
| 2014/0017379 A1 | * | 1/2014 | Segall .................... | A23J 1/142 |
| | | | | 426/549 |
| 2014/0356510 A1 | | 12/2014 | Schweizer | |
| 2016/0050956 A1 | * | 2/2016 | Segall .................... | A23J 3/16 |
| | | | | 426/590 |
| 2020/0015496 A1 | | 1/2020 | Schweizer | |

FOREIGN PATENT DOCUMENTS

| | | | |
|---|---|---|---|
| CN | 1625965 | | 6/2005 |
| CN | 102396643 | | 4/2012 |
| CN | 104719611 | | 6/2015 |
| CN | 105246348 | | 1/2016 |
| EP | 1 512 328 | * | 9/2004 |
| JP | H06505162 | | 6/1994 |
| JP | 2005080668 | | 3/2005 |
| JP | 2011530274 | | 12/2011 |
| JP | 2016519942 | | 7/2016 |
| WO | 9215697 | | 9/1992 |
| WO | 2009155557 A2 | | 12/2009 |
| WO | 2010092778 | | 8/2010 |
| WO | 2014190418 | | 12/2014 |

OTHER PUBLICATIONS

Aluko et al., "Determination of Nutritional and Bioactive Properties of Peptides in Enzymatic Pea, Chickpea, and Mung Bean Protein Hydrolysates", Journal of AOAC International, vol. 91, No. 4, 2008, pp. 947-956. (Year: 2008).*
Tömösközi et al.,"Isolation and study of the functional properties of pea proteins", Nahrung/Food, 45, No. 6, (2001), pp. 399-401. (Year: 2001).*
L. M. Humiski et al., "Physicochemical and Bitterness Properties of Enzymatic Pea Protein Hydrolysates", Journal of Food Science, (20070000), vol. 71, No. 8, pp. S605-S611, XP002664213.

* cited by examiner

*Primary Examiner* — Elizabeth Gwartney
(74) *Attorney, Agent, or Firm* — Marks & Clerk

(57) ABSTRACT

The invention relates to a method of processing a pulse protein material, which comprises effecting hydrolysis of the pulse protein material, optionally adjusting the pH, then separating to form a soluble fraction and processing the soluble fraction to provide a pulse protein hydrolyzate which is substantially completely soluble throughout the pH range of about 2 to about 7 and which provides little or no astringency when an acidic beverage containing the pulse protein hydrolyzate is consumed and a solid residue, and processing the solid residue to provide a second pulse protein hydrolyzate having an improved Amino Acid Score, which is improved compared to the substrate pulse protein material.

9 Claims, No Drawings

PREPARATION OF ACID SOLUBLE PULSE PROTEIN HYDROLYZATES WITH LITTLE OR NO ASTRINGENCY AND PULSE PROTEIN HYDROLYZATES OF IMPROVED AMINO ACID SCORE

REFERENCE TO RELATED APPLICATION

This application claims priority under 35 USC 119(e) from U.S. Provisional Patent Application No. 62/466,581 filed Mar. 3, 2017.

FIELD OF INVENTION

The invention relates to the utilization of enzyme hydrolysis to produce pulse protein hydrolyzates with little or no astringency in acidic solution as well as pulse protein hydrolyzates having a modified amino acid profile providing a higher Amino Acid Score.

BACKGROUND TO THE INVENTION

There is significant commercial interest in preparing acidic beverages containing pulse protein. Ideally the pulse protein product should be completely soluble in the beverage so that stabilizers are not required to suspend the protein in solution. The pulse protein should also be heat stable in the acid beverage to facilitate commercial beverage processing (e.g. hot fill processing). Clarity of the pulse protein product in solution is also desirable as it allows maximum flexibility in designing the cloud level of the beverage. That is, the beverage could be clear or clouding agents could be added to provide the appropriate level of haze.

U.S. patent application Ser. No. 13/103,528 filed May 9, 2011 (US Patent Publication No. 2011/0274797 published Nov. 10, 2011), Ser. No. 13/556,357 filed Jul. 24, 2012 (US Patent Publication No. 2013/00189408 published Jul. 25, 2013), Ser. No. 13/642,003 filed Jan. 7, 2013 (US Patent Publication No. 2013/0129901 published May 23, 2013) and Ser. No. 15/041,193 filed Feb. 11, 2016 (US Patent Publication No. 2016/0227833 published Aug. 11, 2016 ("YP701")), assigned to the assignee hereof and the disclosures of which are incorporated herein by reference, describe a pulse protein product which is water soluble at low pH, producing heat stable solutions, but use of which is limited by an astringent sensation it introduces in the mouth when consumed. The astringent sensation is unpleasant and undesirably limits the amount of protein product that can be formulated into an acid beverage.

U.S. patent application Ser. No. 14/290,415 filed May 29, 2014 (US Patent Publication No. 2014/0356510 published Dec. 4, 2014) entitled "Production of Pulse Protein Product with Reduced Astringency", assigned to the assignee hereof and the disclosure of which is incorporated herein by reference, describes precipitation and membrane technologies that allow the preparation of pulse protein products which are water soluble at low pH, produce heat stable solutions and provide a reduced astringent sensation when consumed. However, such low astringent products are produced in a low yield.

The astringency of acidic beverages containing pulse (or other) proteins is believed to be related to the protein becoming insoluble in the mouth. One possible explanation of the cause of this insolubility is that saliva proteins may bind and precipitate the proteins that were dissolved in the acidic beverage. Another theory is that the protein insolubility may arise from the combination of the acidic protein solution and saliva resulting in a pH in the mouth at which the protein is poorly soluble. It is known that protein solubility can be increased by using enzymes to hydrolyze proteins into smaller units.

Proteins are comprised of amino acids. Certain of these amino acids, known as essential amino acids, cannot be synthesized to meet the needs of the human body and so must be acquired through the diet. A significant contributor to protein quality is the content of essential amino acids in the protein. The bioavailability of these amino acids is another important factor. The content of essential amino acids in a protein forms the basis of the measurement known as the Amino Acid Score (AAS). Amino Acid Score is assessed by comparing the essential amino acid content of a given protein to a reference pattern of essential amino acids. The content of each essential amino acid (mg/g protein) is divided by the content of the same essential amino acid in the reference pattern (mg/g protein). The lowest resulting value, obtained for the most limiting essential amino acid, is considered the Amino Acid Score (AAS) (Report of Joint FAO/WHO Expert Consultation (1991) Protein Quality Evaluation, FAO Food and Nutrition Paper 51; Schaarfsma, G. 2000. J. Nutr., 130: 1865S). A protein that supplies all the essential amino acids in the same proportions as the reference pattern would have an Amino Acid Score of 1.0. Proteins having high Amino Acid Scores are valued by food manufacturers. Traditionally, the Amino Acid Scores of pea protein have been limited by the concentration of sulfur containing amino acids. A pea protein product with an improved Amino Acid Score would be of commercial value. It should be noted that the Amino Acid Score of a protein is often factored into a PDCAAS value, where the AAS is corrected by a protein digestibility factor, so as to account for the bioavailability. The current invention is concerned only with the Amino Acid Score.

SUMMARY OF THE INVENTION

In accordance with the present invention, pulse proteins are hydrolyzed, and the resulting solution is optionally adjusted in pH and then fractionated into a soluble fraction and a residual solids fraction. The soluble fraction is further processed to provide a pulse protein hydrolyzate which is substantially completely soluble throughout the pH range of about 2 to about 7 and provides little or no astringency when an acidic beverage containing the pulse protein hydrolyzate is consumed. The insoluble residue of the hydrolysis treatment is further processed to provide a second pulse protein hydrolyzate, having an Amino Acid Score that is improved compared to the substrate protein and preferably above, at or close to 1.0. Note that the term "protein hydrolyzate" is used herein to describe the product of a process that involves a protein hydrolysis step and it is not intended to infer anything about the extent of hydrolysis in the final product.

In accordance with one aspect of the present invention, there is provided a method of processing a pulse protein material, which comprises effecting protein hydrolysis of the pulse protein material, optionally adjusting the pH, then separating to form a soluble fraction and processing the soluble fraction to provide a pulse protein hydrolyzate which is substantially completely soluble throughout the pH range of about 2 to about 7 and which introduces little or no astringency when an acidic beverage containing the pulse protein hydrolyzate is consumed and a solid residue, and processing the solid residue to provide a second pulse protein hydrolyzate having an improved Amino Acid Score, which is improved compared to the substrate pulse protein material.

In accordance with another aspect of the present invention, there is provided a pulse protein hydrolyzate having a protein content of at least about 60 wt % (N×6.25) d.b., which is substantially completely soluble throughout the pH range of about 2 to about 7 and introduces little or no astringency when an acidic beverage containing the pulse protein hydrolyzate is consumed.

In accordance with a further aspect of the present invention, there is provided a pulse protein hydrolyzate having an Amino Acid Score which is improved compared to the substrate pulse protein from which the hydrolyzate is derived.

In accordance with an additional aspect of the present invention, there is provided a method of processing a pulse protein material, which comprises effecting protein hydrolysis of the pulse protein material, optionally adjusting the pH, then separating to form a soluble fraction and processing the soluble fraction to provide a pulse protein hydrolyzate which is substantially completely soluble throughout the pH range of about 2 to about 7 and which introduces little or no astringency when an acidic beverage containing the pulse protein hydrolyzate is consumed.

In accordance with yet another aspect of the present invention, there is provided a pulse protein hydrolyzate having a molecular weight profile as follows:
>100,000 Da-0 to 14 wt %
15,000 to 100,000 Da-4 to 30 wt %
5000 to 15,000 Da-20 to 29 wt %
1,000 to 5,000 Da-27 to 54 wt %
<1,000 Da-8 to 23 wt %.

As would be known to one skilled in the art, the protein content of a protein hydrolyzate may be determined by the content of nitrogen in the hydrolyzate multiplied by a conversion factor (generally 6.25) and expressed as a percentage on a dry weight basis.

GENERAL DESCRIPTION OF THE INVENTION

The utilization of a procedure involving protein hydrolysis of a pulse protein substrate and further processing of the soluble portion of the hydrolyzate to provide a first pulse protein hydrolyzate having little or no astringency in acidic solution and further processing of the insoluble portion of the hydrolyzate to provide a second pulse protein hydrolyzate with an improved Amino Acid Score may be implemented on a number of pulse protein substrates.

1) Starting from dry powder (neutral)—A dry powder pulse protein product that may be used is the 810N pulse protein product described in copending U.S. patent application Ser. No. 14/811,052 filed Jul. 28, 2015 (US Patent Publication No. 2016/0050956 published Feb. 25, 2016) assigned to the assignee hereof and incorporated herein by reference. This product having a protein content of greater than about 60 wt % d.b. and a natural pH in solution that is neutral or near neutral (pH about 6.0 to about 8.0). Alternatively, dry powder, commercial pulse protein products having a protein content of greater than about 65 wt % d.b. and a natural pH in solution that is neutral or near neutral (pH about 6.0 to about 8.0) may be used.

The procedure for treatment of the neutral dry powder product involves rehydration of the protein powder to provide a protein solution, optional adjustment of the solution pH within the range of about 6.0 to about 8.0, treatment of the protein solution with proteolytic enzyme, heat treatment of the enzymatically treated material to inactivate the enzyme, adjustment of the pH of the resulting solution to an acid value, such as about pH 2 to about pH 4, centrifugation to separate centrate (soluble fraction) from residual solids, concentration and optional diafiltration of the centrate on a membrane filtration system to decrease the content of salt and/or other impurities in the centrate and drying the retentate to provide a pulse protein hydrolyzate having a protein content greater than about 60 wt % (N×6.25) d.b. on a dry weight basis and which is acid soluble and provides little or no astringency when tasted in acidic solution. This pulse protein hydrolyzate has an acidic natural pH in solution, which facilitates the formulation of acidic beverage products. Alternatively, the heat treatment step may be effected after the acidification step but prior to the centrifugation step.

The residual solids separated from the soluble fraction have an improved Amino Acid Score compared to the substrate protein and may be further processed to provide a second pulse protein hydrolyzate. The separated residual solids, which have an acidic pH, may be directly dried or washed and then dried to provide a pulse protein hydrolyzate having a protein content greater than about 60 wt % (N×6.25) d.b. Alternatively, the residual solids may be adjusted in pH to about 6.0 to about 8.0 and then dried. As a further alternative, the residual solids may be washed then adjusted in pH to about 6.0 to about 8.0 prior to the drying step. As a further alternative, the solids may be neutralized during the washing step by adjusting the mixture of solids and wash water to a pH of about 6.0 to about 8.0 using food grade alkali solution, then collecting the solids by centrifugation and drying the solids to provide a pulse protein hydrolyzate having a protein content of at least about 60 wt % (N×6.25) d.b.

The neutral dry powder pulse protein product starting material may also be treated without an acidification step. Such a procedure involves rehydration of the protein powder to provide a protein solution, optional adjustment of the solution pH within the range of about 6.0 to about 8.0, treatment of the protein solution with proteolytic enzyme, heat treatment of the enzymatically treated material to inactivate the enzyme, centrifugation to separate centrate (soluble fraction) from residual solids, concentration and optional diafiltration of the centrate on a membrane filtration system to decrease the content of salt and/or other impurities in the centrate and drying the retentate to provide a pulse protein hydrolyzate having a protein content greater than about 60 wt % (N×6.25) d.b. on a dry weight basis and which is acid soluble and provides little or no astringency when tasted in acidic solution.

The residual solids separated from the centrate, have an improved Amino Acid Score compared to the substrate protein and may be directly dried or washed then dried to provide a second pulse protein hydrolyzate having a protein content greater than about 60 wt % (N×6.25) d.b.

2) Starting from dry powder (low pH)—A dry powder pulse protein product that may be used is the 810A pulse protein product described in the aforementioned U.S. patent application Ser. No. 14/811,052. This product has a protein content of greater than about 60 wt % d.b. and a low natural pH in solution (pH about 1.5 to about 4.0). Alternatively, dry, commercial pulse protein products having a protein content of greater than about 65 wt % d.b. and a low natural pH in solution (pH about 1.5 to about 4.0) may be used.

One procedure for treatment of the low pH dry powder pulse protein product involves an initial rehydration of the protein powder to form a protein solution and adjustment of the pH of the protein solution to the neutral range (pH about 6.0 to about 8.0). These steps are followed by the steps described above for the solutions prepared from neutral dry powder pulse protein product, namely either treatment with proteolytic enzyme, heat treatment to inactivate the enzyme (alternatively heat treatment may be effected after acidification), adjustment of pH to an acid value, such as about pH 2 to about pH 4, centrifugation to effect a solid/liquid separation, concentration and optional diafiltration of the centrate, and drying the retentate to provide a pulse protein hydrolyzate having a protein content of at least about 60 wt % (N×6.25) d.b. and which is acid soluble and provides little or no astringency when tasted in acidic solution, or alternatively, similar treatment without the acidification step. When the acidification step is employed, the resulting pulse protein hydrolyzate has an acidic natural pH in solution, which facilitates the formulation of acidic beverage products. As when neutral dry powder is the starting material, the residual solids, which have an improved Amino Acid Score compared to the substrate protein, may be further processed to form a second pulse protein hydrolyzate. The residual solids may be directly dried or washed and then dried to provide a pulse protein hydrolyzate having a protein content of at least about 60 wt % (N×6.25) d.b. When the process with the acidification step is employed, the residual solids may be adjusted in pH to about 6.0 to about 8.0 and then dried. As a further alternative for the process employing the acidification step, the washed solids may be adjusted in pH to about 6.0 to about 8.0 after the washing step and prior to the drying step. As a further alternative for the process employing the acidification step, the solids may be neutralized during the washing step by adjusting the mixture of solids and wash water to a pH of about 6.0 to about 8.0 using food grade alkali solution, then collecting the solids by centrifugation and drying the solids to provide a pulse protein hydrolyzate having a protein content of at least about 60 wt % (N×6.25) d.b.

As alternative to conducting the enzyme treatment in the neutral pH range, the low pH protein powder may be rehydrated to form a protein solution and then the proteolytic enzyme treatment applied without pH adjustment of the protein solution or after optional adjustment of the solution pH within the range of about 1.5 to about 4.0. The enzyme treatment is followed by heat treatment to inactivate the enzyme, centrifugation to effect a solid/liquid separation, concentration and optional diafiltration of the centrate, and drying the retentate to provide a pulse protein hydrolyzate having a protein content of at least about 60 wt % (N×6.25) d.b. and which is acid soluble and provides little or no astringency when tasted in acidic solution. This pulse protein hydrolyzate has an acidic natural pH in solution, which facilitates the formulation of acidic beverage products. The residual solids, which have an improved Amino Acid Score compared to the substrate protein may be further processed to form a second pulse protein hydrolyzate. The residual solids, which have an acidic pH, may be directly dried or washed and then dried to provide a pulse protein hydrolyzate having a protein content of at least about 60 wt % (N×6.25) d.b. Alternatively, the residual solids may be adjusted in pH to about 6.0 to about 8.0 and then dried. As a further alternative, the washed solids may be adjusted in pH to about 6.0 to about 8.0 after the washing step and prior to the drying step. As a further alternative, the solids may be neutralized during the washing step by adjusting the mixture of solids and wash water to a pH of about 6.0 to about 8.0 using food grade alkali solution, then collecting the solids by centrifugation and drying the solids to provide a pulse protein hydrolyzate having a protein content of at least about 60 wt % (N×6.25) d.b.

3) Enzyme treatment in pulse 810 process—The pulse 810 process involves membrane processing of a low pH protein solution, which may be dried to form 810A or neutralized and dried to form 810N.

The procedure for enzyme treatment in the pulse 810 process involves the preparation of a partially or fully concentrated acidic protein solution by the procedure described in the aforementioned pulse 810 US patent application followed by an optional dilution step. The optionally diluted protein solution may be adjusted to a pH of about 6.0 to about 8.0 and then enzyme hydrolyzed or the enzyme hydrolysis may be conducted at the initial low pH value or optionally after pH adjustment within the range of about 1.5 to about 4.0. When the optionally diluted protein solution is adjusted in pH to about 6.0 to about 8.0, the pH adjustment step is followed by the steps utilized to process the protein solution prepared from neutral dry powder pulse protein product or the neutralized solution of low pH dry powder pulse protein product described above, namely treatment with proteolytic enzyme, heat treatment to inactivate the enzyme (alternatively heat treatment may be effected after pH adjustment), pH adjustment to an acid value, such as about pH 2 to about pH 4, centrifugation to effect solids/liquid separation, concentration and optional diafiltration of the centrate on a membrane filtration system and drying the retentate or alternatively, similar processing without the acidification step, to yield a pulse protein hydrolyzate having a protein content of at least 60 wt % (N×6.25) d.b. and which is acid soluble and provides little or no astringency when tasted in acidic solution. When the acidification step is employed, the resulting pulse protein hydrolyzate has an acidic natural pH in solution, which facilitates the formulation of acidic beverage products. As with the above-described procedures, the residual solids, which have an improved Amino Acid Score compared to the substrate protein may be further processed, such as by directly drying or washing and then drying to provide a pulse protein hydrolyzate having a protein content greater than about 60 wt % (N×6.25) d.b. When the process with the acidification step is employed, the solids may be adjusted in pH to about 6.0 to about 8.0 prior to the drying step or washed and then adjusted in pH to about 6.0 to about 8.0 prior to the drying step. As a further alternative for the process employing the acidification step, the solids may be neutralized during the washing step by adjusting the mixture of solids and wash water to a pH of about 6.0 to about 8.0 using food grade alkali solution, then collecting the solids by centrifugation and drying the solids to provide a pulse protein hydrolyzate having a protein content of at least about 60 wt % (N×6.25) d.b.

When the optionally diluted protein solution derived from the 810 process is processed without initial pH adjustment to the range of about 6.0 to about 8.0, the acidic protein solution is processed by the steps described above for the protein solution prepared from the low pH dry powder pulse protein product without a subsequent neutralization step, namely optional adjustment of the solution pH within the range of about 1.5 to about 4.0, treatment with proteolytic enzyme, heat treatment to inactivate the enzyme, centrifugation to effect solids/liquid separation, concentration and optional diafiltration of the centrate on a membrane filtration system and drying the retentate to yield a pulse protein hydrolyzate having a protein content of at least 60 wt % (N×6.25) d.b. and which is acid soluble and provides little or no astringency when tasted in acidic solution. This pulse protein hydrolyzate has an acidic natural pH in solution, which facilitates the formulation of acidic beverage products. The residual solids, which have an improved Amino Acid Score compared to the substrate protein may be further processed, such as by directly drying or washing and then drying to provide a pulse protein hydrolyzate having a protein content greater than about 60 wt % (N×6.25) d.b. Alternatively, the solids may be adjusted in pH to about 6.0 to about 8.0 prior to the drying step or may be washed then adjusted in pH to about 6.0 to about 8.0 and prior to the drying step. As a further alternative, the solids may be neutralized during the washing step by adjusting the mixture of solids and wash water to a pH of about 6.0 to about 8.0 using food grade alkali solution, then collecting the solids by centrifugation and drying the solids to provide a pulse protein hydrolyzate having a protein content of at least about 60 wt % (N×6.25) d.b.

4) Enzyme treatment on dryer feed for commercial products.

In procedures 1) and 2), there is discussion of rehydrating commercial pulse protein products and enzyme treating them. It would be more practical to conduct the enzyme treatment on the material before drying, and thus the invention includes treatment of dryer feed according to the procedure described in 1) or 2) above except that it would not be necessary to rehydrate the protein product.

One class of pulse protein hydrolyzates arising from the above procedures are substantially soluble over the pH range of about 2 to about 7 and provide little or no astringent sensation when tasted in acidic solution. Acidic solutions of the product of the invention are preferably clear and heat stable. The second class of pulse protein hydrolyzates arising from the above procedures have an improved Amino Acid Score compared to the substrate protein. Some degree of bitterness may be developed during the protein hydrolysis step, but ideally the products of the invention have little or no bitterness. Different proteolytic enzymes have different activities at different pH values. Selection of a proteolytic enzyme for use in the present invention may be influenced by factors such as the pH of the hydrolysis and the level of bitterness in the final product. The length of time for the enzyme treatment may also influence the properties of the final products. Generally, a relatively short treatment time, such as about 30 minutes to about 60 minutes is preferred.

EXAMPLES

Example 1

This Example describes the preparation of pulse protein hydrolyzates from neutral, dry powder pulse protein product according to an embodiment of the method of the present invention.

36 kg of yellow pea protein concentrate was added to 600 L of reverse osmosis purified water at ambient temperature and agitated for 10 minutes to provide an aqueous protein solution. A portion of the suspended solids were removed by centrifugation using a decanter centrifuge and a protein solution having a protein content of 2.34% by weight was collected. The pH of the protein solution was lowered to 3.07 by the addition of HCl solution (concentrated HCl diluted with an equal volume of water) and then the solution was warmed to 50° C., held for 10 minutes, then centrifuged using a disc stack centrifuge. 519 L of acidified protein solution and 77.44 kg of acid insoluble solid material were collected.

The acidified protein solution, having a protein content of 0.82 wt %, was adjusted in pH to 1.92 and then reduced in volume from 520 L to 70 L by concentration on a polyethersulfone membrane having a molecular weight cut-off of 100,000 daltons, operated at a temperature of about 51° C. The protein solution, with a protein content of 5.32 wt %, was then diafiltered on the same membrane with 630 L of RO water adjusted to pH 2 with HCl solution, followed by diafiltration with an additional 150 L of RO water. The diafiltration operation was conducted at about 51° C. The diafiltered protein solution, having a protein content of 4.64 wt % was then further concentrated to a protein content of 8.11 wt %. 34.5 kg of concentrated and diafiltered protein solution was pasteurized at about 72° C. for 16 seconds and then cooled. 28.38 kg of the pasteurized protein solution was adjusted in pH to 7.12 with a solution containing 12.5 wt % NaOH and 12.5 wt % KOH (henceforth referred to as NaOH/KOH solution) and then spray dried to yield a product found to have a protein content of 91.75% (N×6.25) d.b. The product was termed YP29-E02-16A YP810N-02.

36 kg of yellow pea protein concentrate was added to 600 L of reverse osmosis purified water at ambient temperature and agitated for 10 minutes to provide an aqueous protein solution. A portion of the suspended solids were removed by centrifugation using a decanter centrifuge and a protein solution having a protein content of 2.40% by weight was collected. The pH of the protein solution was lowered to 3.00 by the addition of HCl solution (concentrated HCl diluted with an equal volume of water) and then the solution was warmed to 50° C., held for 10 minutes then centrifuged using a disc stack centrifuge. 508 L of acidified protein solution and 69.39 kg of acid insoluble solid material were collected.

The acidified protein solution, having a protein content of 1.04 wt %, was adjusted in pH to 2.07 and then reduced in volume from 510 L to 70 L by concentration on a polyethersulfone membrane having a molecular weight cut-off of 100,000 daltons, operated at a temperature of about 50° C. The protein solution, with a protein content of 6.21 wt %, was then diafiltered on the same membrane with 630 L of RO water adjusted to pH 2 with HCl solution, followed by diafiltration with an additional 145 L of RO water. The diafiltration operation was conducted at about 50° C. The diafiltered protein solution, having a protein content of 5.73 wt % was then further concentrated to a protein content of 9.50 wt %. 31.7 kg of concentrated and diafiltered protein solution was pasteurized at about 72° C. for 16 seconds and then cooled. The pasteurized solution was diluted to 38.44 kg. 18 kg of this solution was adjusted in pH to 6.93 with NaOH/KOH solution and diluted with 3 L of RO water then spray dried to yield a product found to have a protein content of 91.42% (N×6.25) d.b. The product was termed YP29-E04-16A YP810N-02.

1.625 kg of YP29-E02-16A YP810N-02 and 0.667 kg of YP29-E04-16A YP810N-02 were mixed with 20 L of RO water to form a protein solution containing 2 kg of substrate protein. This solution had a pH of 6.59. NaOH/KOH solution was added to raise the pH of the sample to 6.95. The sample was then warmed to about 50° C. and 20 ml of the proteolytic enzyme Flavourzyme (Novozymes) was added. The sample was held at about 50° C. and mixed for 1 hour. The enzyme was inactivated by heat treating the solution at about 90° C. for 10 minutes and then the treated protein solution was cooled to room temperature. This sample had a pH of 6.89 and a protein content of 9.87 wt %. The pH of the sample was then lowered to 3.02 using a solution of concentrated HCl mixed with an equal volume of RO water.

The acidified sample was centrifuged batchwise at 6,000 rpm for 9 or 10 minutes in the HG-4L rotor of a Sorvall RC-3 centrifuge to provide 15.94 kg of centrate (soluble fraction) and 5.05 kg of residual solids.

15.9 L of centrate was combined with one volume of pH 3 RO water and the sample concentrated to the original volume on a Dow Filmtec NF-2540 nanofiltration membrane operated at ambient temperature. This batchwise diafiltration was repeated nine additional times. The sample was then reduced in volume to 5.4 kg by concentration on the same membrane. The diafiltered and concentrated protein hydrolyzate solution had a protein content of 9.62 wt %. This protein hydrolyzate solution was pasteurized at about 72° C. for less than 5 minutes. The pasteurized solution was then spray dried to yield a pea protein hydrolyzate having a protein content of 94.31 (N×6.25) d.b. The product was termed YP29-H11-16A YP820A.

3 kg of residual solids were mixed with 4 volumes of RO water and then the pH of the sample raised to about 7 with NaOH/KOH solution. The sample was then centrifuged to provide 2.955 kg of washed solids. The 2.955 kg of washed solids were combined with 2.955 kg of RO water (to facilitate spray drying) and then spray dried to yield a pea protein hydrolyzate having a protein content of 92.31% (N×6.25) d.b. The product was termed YP29-H11-16A YP820PN.

Example 2

This Example describes another example of the preparation of pulse protein hydrolyzates from neutral, dry powder pulse protein product according to an embodiment of the method of the present invention.

36 kg of yellow pea protein concentrate was added to 600 L of reverse osmosis purified water at ambient temperature and agitated for 10 minutes to provide an aqueous protein solution. A portion of the suspended solids were removed by centrifugation using a decanter centrifuge and a protein solution having a protein content of 2.72% by weight was collected. The pH of the protein solution was lowered to a pH of about 3 by the addition of HCl solution (concentrated HCl diluted with an equal volume of water), the solution was warmed to 50° C., held for 10 minutes and then centrifuged using a disc stack centrifuge. 474.8 L of acidified protein solution and 85.85 kg of acid insoluble solid material were collected.

The acidified protein solution, having a protein content of 1.66 wt %, was diluted with 25 L of water and then reduced in volume to 145 L by concentration on a microfiltration membrane having a molecular weight cut-off of 0.80 µm and operated at about 52° C. The protein solution was then further concentrated while concurrently diafiltering it with RO water adjusted to pH 2 with HCl solution, the concentration and diafiltration being conducted at a temperature of about 52° C. A total of 580 L of microfiltration permeate (clarified, acidified protein solution) having a protein content of 1.28 wt % was collected. This solution was reduced in volume to 125 L by concentration on a polyethersulfone membrane having a molecular weight cut-off of 100,000 daltons, operated at a temperature of about 47° C. The protein solution, with a protein content of 5.17 wt %, was then diafiltered on the same membrane with 1125 L of RO water adjusted to pH 2 with HCl solution, followed by diafiltration with an additional 125 L of RO water. The diafiltration operation was conducted at about 50° C. The diafiltered protein solution, having a protein content of 4.50 wt % was then further concentrated to a protein content of 10.01 wt %. 47 L of concentrated and diafiltered protein solution was pasteurized at about 74° C. for 16 seconds and then cooled. 56.56 kg of the pasteurized protein solution was combined with 13.25 kg of RO water and sufficient NaOH/KOH solution to adjust the pH to 6.94 and then the mixture was spray dried to yield a product found to have a protein content of 90.37% (N×6.25) d.b. The product was termed YP35-G19-16A YP810N.

2.322 kg of YP35-G19-16A YP810N was mixed with 20 L of RO water to form a protein solution containing 2 kg of substrate protein. This solution had a pH of 6.87. The sample was warmed to about 50° C. and 5 g of proteolytic enzyme (Enzeco Bromelain Concentrate, Enzyme Development Corporation) was added. The sample was held at about 50° C. and mixed for 30 minutes. The enzyme was inactivated by heat treating the solution about 80° C. for 10 minutes and then the treated protein solution cooled to room temperature. This sample had a pH of 6.47 and a protein content of 9.79%. The pH of the sample was then lowered to 1.93 using a solution of concentrated HCl mixed with an equal volume of RO water. The acidified sample was centrifuged batchwise at 6,000 rpm for 10 minutes in the HG-4L rotor of a Sorvall RC-3 centrifuge to provide 16.46 kg of centrate (soluble fraction) and 4.58 kg of residual solids.

16.46 kg of centrate was combined with two volumes of pH 2 RO water and the sample concentrated to the original volume on a Dow Filmtec NF-2540 nanofiltration membrane operated at ambient temperature. This batchwise diafiltration was repeated four additional times. The sample was then reduced in volume to 8.90 kg by concentration on the same membrane. The diafiltered and concentrated protein hydrolyzate solution had a protein content of 8.01 wt %. This protein hydrolyzate solution was pasteurized at about 73° C. for less than 2 minutes. The pasteurized solution was then spray dried to yield a pea protein hydrolyzate having a protein content of 96.33% (N×6.25) d.b. The product was termed YP35-I19-16A YP820A.

126.5 g of residual solids were mixed with 506 g of RO water and then the pH of the sample raised to about 7 with NaOH/KOH solution. The sample was centrifuged and 100.70 g of washed solids were freeze dried to yield a pea protein hydrolyzate having a protein content 84.69% (N×6.25) w.b. The product was termed YP35-I19-16A YP820PN.

Example 3

This Example describes another example of the preparation of pulse protein hydrolyzates from neutral, dry powder pulse protein product according to an embodiment of the method of the present invention.

96 kg of yellow pea protein flour was added to 600 L of reverse osmosis purified water at ambient temperature and agitated for 10 minutes to provide an aqueous protein solution. A portion of the suspended solids were removed by centrifugation using a decanter centrifuge and a protein solution having a protein content of 3.94% by weight was collected. The pH of the protein solution was lowered to 2.05 by the addition of HCl solution (concentrated HCl diluted with an equal volume of water), the solution was warmed to 50° C., held for 10 minutes and then centrifuged using a disc stack centrifuge. 524 L of acidified protein solution and 83.98 kg of acid insoluble solid material were collected.

The acidified protein solution, having a protein content of 3.46 wt %, was reduced in volume to 190 L by concentration on a microfiltration membrane having a molecular weight cut-off of 0.80 μm operated at about 54° C. The protein solution was then further concentrated while concurrently diafiltering it with pH 2 RO water at about 54° C. A total of 520 L of microfiltration permeate (clarified, acidified protein solution) having a protein content of 2.05 wt % was collected. This solution was reduced in volume to 150 L by concentration on a polyethersulfone membrane having a molecular weight cut-off of 100,000 daltons, operated at a temperature of about 50° C. The protein solution, with a protein content of 5.20 wt %, was then diafiltered on the same membrane with 1350 L of RO water adjusted to pH 2 with HCl solution, followed by diafiltration with an additional 180 L of RO water. The diafiltration operation was conducted at about 51° C. The diafiltered protein solution, having a protein content of 5.30 wt % was then further concentrated to a protein content of 9.69 wt %. 80 L of concentrated and diafiltered protein solution was diluted with 20 L of water and then pasteurized at about 77° C. for 16 seconds and then cooled. The pasteurized protein solution was adjusted to pH 6.98 with NaOH/KOH solution and then spray dried to yield a product found to have a protein content of 89.38% (N×6.25) d.b. The product was termed YP34-G27-16A YP810N.

2.32 kg of YP34-G27-16A YP810N was mixed with 20 L of RO water to form a protein solution containing 2 kg of substrate protein. This solution had a pH of 6.77. NaOH/KOH solution was added to raise the pH of the sample to 7.01. The sample was then warmed to about 50° C., diluted with 10 L RO water and then 10 ml of proteolytic enzyme (Liquipanol T-200, Enzyme Development Corporation) was added. The sample was held at about 50° C. and mixed for 30 minutes. The enzyme was inactivated by heat treating the solution about 80° C. for 10 minutes and then the treated protein solution cooled to room temperature. This sample had a pH of 6.57 and a protein content of 6.61%. The pH of the sample was then lowered to 1.96 using a solution of concentrated HCl mixed with an equal volume of RO water. The acidified sample was centrifuged batchwise at 6,000 rpm for 10 minutes in the HG-4L rotor of a Sorvall RC-3 centrifuge to provide 26.94 kg of centrate (soluble fraction) and 4.84 kg of residual solids.

26.94 kg of centrate was combined with 2 volumes of pH 2 RO water and the sample concentrated to the original volume on a Dow Filmtec NF2540 nanofiltration membrane operated at ambient temperature. This batchwise diafiltration was repeated four additional times. The sample was then reduced in volume by concentration on the same membrane. The diafiltered and concentrated protein hydrolyzate solution had a protein content of 7.31 wt %. This protein hydrolyzate solution was pasteurized at about 72° C. for 16 seconds. The pasteurized solution was then spray dried to yield a pea protein hydrolyzate having a protein content of 95.75% (N×6.25) d.b. The product was termed YP34-I26-16A YP820A.

139.7 g of residual solids were mixed with 559 g of RO water and then the pH of the sample raised to about 7 with NaOH/KOH solution. The sample was centrifuged at 6,000 rpm for 10 minutes in the HG-4L rotor of a Sorvall RC-3 centrifuge to provide 117 g of washed solids, 100 g of which were freeze dried to yield a pea protein hydrolyzate having a protein content 80.32% (N×6.25) w.b. The product was termed YP34-I26-16A YP820PN.

Example 4

This Example describes an example of the preparation of pulse protein hydrolyzates from pH adjusted, concentrated protein solution prepared according to the process of U.S. Ser. No. 14/811,052, according to an embodiment of the method of the present invention.

18 kg of yellow pea protein concentrate was added to 300 L of reverse osmosis purified water at ambient temperature and agitated for 10 minutes to provide an aqueous protein solution. A portion of the suspended solids were removed by centrifugation using a decanter centrifuge and a protein solution having a protein content of 2.80% by weight was collected. The pH of the protein solution was lowered to 2.03 by the addition of HCl solution (concentrated HCl diluted with an equal volume of water), the solution was warmed to 50° C., held for 10 minutes and then centrifuged using a disc stack centrifuge. 245 L of acidified protein solution and an unrecorded weight of acid insoluble solid material were collected.

The acidified protein solution was reduced in volume to 93 L by concentration on a polyethersulfone membrane having a molecular weight cut-off of 100,000 daltons, operated at a temperature of about 44° C. The protein solution, with a protein content of 5.41 wt %, was then diafiltered on the same membrane with 855 L of RO water adjusted to pH 2 with HCl solution, followed by diafiltration with additional RO water (volume not recorded). The diafiltration operation was conducted at about 51° C. The diafiltered protein solution, having a protein content of 4.48 wt % was then further concentrated to a protein content of 10.52 wt %.

23.86 kg of concentrated and diafiltered protein solution was adjusted to pH 7.23 with NaOH/KOH solution. The sample was then warmed to about 50° C. and 25 g of proteolytic enzyme (Flavourzyme, Novozymes) was added. The sample was held at about 50° C. and mixed for 1 hour. The enzyme was inactivated by heat treating the solution at about 90° C. for 10 minutes and then the treated protein solution cooled to room temperature. This sample had a pH of 7.10 and a protein content of 10.03%. The pH of the sample was then lowered to 3.12 using a solution of concentrated HCl mixed with an equal volume of RO water. The acidified sample was centrifuged to provide 13.38 kg of centrate (soluble fraction) and 9.36 kg of residual solids.

13.38 kg of centrate, having a protein content of 2.49 wt % was combined with 26.76 kg of RO water adjusted to pH 3 with HCl solution and the sample concentrated to 13.38 kg on a Dow Filmtec NF-2540 nanofiltration membrane operated at ambient temperature. This batchwise diafiltration was repeated four additional times. The sample was then reduced in volume by concentration on the same membrane. The diafiltered and concentrated protein hydrolyzate solution had a protein content of 2.88 wt %. This protein hydrolyzate solution was pasteurized at about 72° C. for 16 seconds. The pasteurized solution was then spray dried to yield a pea protein hydrolyzate having a protein content of 91.13% (N×6.25) d.b. The product was termed YP35-J06-16A YP822A.

200 g of residual solids were mixed with 800 g of RO water and then the pH of the sample raised to about 7 with NaOH/KOH solution. The sample was centrifuged to provide 216.08 g of washed solids, a portion of which were freeze dried to yield a pea protein hydrolyzate having a protein content 77.72% (N×6.25) w.b. The product was termed YP35-J06-16A YP822PN.

Example 5

This Example describes preparation of the pulse protein hydrolyzates of the present invention from pH adjusted, concentrated protein solution prepared according to the process of U.S. Ser. No. 14/811,052, according to an embodiment of the method of the present invention.

18 kg of yellow pea protein concentrate was added to 300 L of reverse osmosis purified water at ambient temperature and agitated for 10 minutes to provide an aqueous protein solution. A portion of the suspended solids were removed by centrifugation using a decanter centrifuge and a protein solution having a protein content of 2.85% by weight was collected. The pH of the protein solution was lowered to 2.07 by the addition of HCl solution (concentrated HCl diluted with an equal volume of water), the solution was warmed to 50° C., held for 10 minutes and then centrifuged using a disc stack centrifuge. 240 L of acidified protein solution and an unrecorded weight of acid insoluble solid material were collected.

The acidified protein solution, having a protein content of 2.37 wt %, was reduced in volume to 110 L by concentration on a polyethersulfone membrane having a molecular weight cut-off of 100,000 daltons, operated at a temperature of about 47° C. The protein solution, with a protein content of 4.96 wt %, was then diafiltered on the same membrane with 990 L of RO water adjusted to pH 2 with HCl solution, followed by diafiltration with an additional 110 L of RO water. The diafiltration operation was conducted at about 51° C. The diafiltered protein solution, having a protein content of 4.64 wt % was then further concentrated to provide 53.36 kg of concentrated and diafiltered protein solution having a protein content of 7.76 wt %.

40.18 kg of concentrated and diafiltered protein solution was adjusted to pH 7.07 with NaOH/KOH solution. The sample was then warmed to about 50° C. and 3.35 g of proteolytic enzyme (Liquipanol T-200, Enzyme Development Corporation) was added. The sample was held at about 50° C. and mixed for 30 minutes. The enzyme was inactivated by heat treating the solution about 90° C. for 10 minutes and then the treated protein solution cooled to room temperature. This sample had a pH of 6.77 and a protein content of 8.02 wt %. The pH of the sample was then lowered to 2.91 using a solution of concentrated HCl mixed with an equal volume of RO water. The acidified sample was centrifuged to provide 28.26 kg of centrate (soluble fraction) and 11.26 kg of residual solids.

28.26 kg of centrate, having a protein content of 3.26 wt % was combined with 60 L of pH 3 RO water and the sample concentrated to the original volume on a Dow Filmtec NF-2540 nanofiltration membrane operated at ambient temperature. This batchwise diafiltration was repeated three additional times. Then an additional batchwise diafiltration step was conducted where 50 L of pH 3 RO water was added and the sample concentrated to the original volume. The sample was then reduced in volume to 10.48 kg by concentration on the same membrane. The diafiltered and concentrated protein hydrolyzate solution had a protein content of 8.26 wt %. This protein hydrolyzate solution was pasteurized at about 72° C. for 16 seconds. The pasteurized solution was then spray dried to yield a pea protein hydrolyzate having a protein content of 100.14% (N×6.25) d.b. The product was termed YP35-J11-16A YP822A.

11.26 kg of residual solids were mixed with 45.02 kg of RO water and then the pH of the sample raised to about 7 with NaOH/KOH solution. The sample was centrifuged with a disc stack centrifuge to provide 17.75 kg of washed solids. These washed solids were diluted with 5 L of RO water and pasteurized at about 72° C. for 16 seconds. The pasteurized sample was diluted with 5 L of RO water to facilitate drying, then spray dried to yield a pea protein hydrolyzate having a protein content of 80.33% (N×6.25) d.b. The product was termed YP35-J11-16A YP822PN.

Example 6

This Example describes preparation of pulse protein hydrolyzates from acidic, concentrated protein solution prepared according to the process of U.S. Ser. No. 14/811,052, according to an embodiment of the method of the present invention.

36 kg of yellow pea protein concentrate was added to 600 L of reverse osmosis purified water at ambient temperature and agitated for 10 minutes to provide an aqueous protein solution. A portion of the suspended solids were removed by centrifugation using a decanter centrifuge and a protein solution having a protein content of 2.54% by weight was collected. The pH of the protein solution was lowered to 2.02 by the addition of HCl solution (concentrated HCl diluted with an equal volume of water) and then the solution was warmed to about 50° C., held for 10 minutes and then centrifuged using a disc stack centrifuge. 535 L of acidified protein solution was collected having a pH of 2.10 and a protein content of 2.30 wt %.

The acidified protein solution was reduced in volume to 170 L by concentration on a polyethersulfone membrane having a molecular weight cut-off of 100,000 daltons, operated at a temperature of about 48° C. The protein solution, with a protein content of 5.98 wt %, was then diafiltered on the same membrane with 1530 L of RO water adjusted to pH 2 with HCl solution, followed by diafiltration with an additional 270 L of RO water. The diafiltration operation was conducted at about 50° C. The diafiltered protein solution, having a protein content of 5.67 wt % was then further concentrated to a protein content of 9.68 wt %. 85 L of concentrated and diafiltered protein solution was pasteurized at about 72° C. for 16 seconds and then cooled.

55.5 kg of the pasteurized, concentrated and diafiltered protein solution was mixed with 34.5 L of RO water to form a protein solution. This solution had a pH of 2.98 and a protein content of 4.73 wt %. The sample was warmed to about 50° C. and 22.5 g of proteolytic enzyme (Enzeco Fungal Acid Protease Concentrate, Enzyme Development Corporation) was added. The sample was held at about 50° C. and mixed for 1 hour. The enzyme was inactivated by heat treating the solution at about 70° C. for 10 minutes and then cooling it to room temperature. The heat treated sample had a pH of 3.70 and a protein content of 4.46 wt %. This sample was then centrifuged with a disc stack centrifuge to provide 84 L of centrate (soluble fraction) and 18.54 kg of residual solids.

The 84 L of centrate was concentrated to 10.04 kg on a Dow Filmtec NF-2540 nanofiltration membrane operated at about 26° C. The concentrated protein hydrolyzate solution had a protein content of 13.64%. The concentrated protein hydrolyzate solution was pasteurized at about 72° C. for 16 seconds. The pasteurized solution was spray dried to yield a pea protein hydrolyzate having a protein content of 101.08 (N×6.25) d.b. The product was termed YP35-L07-16A YP823A.

The residual solids were washed with 40 L of RO water adjusted to pH 3 with HCl solution and then the slurry centrifuged with a disc stack centrifuge to collect 27.3 kg of washed solids. The washed solids were then combined with 60 L of RO water and sufficient NaOH/KOH solution to adjust the pH to about 7. This slurry was centrifuged with a disc stack centrifuge to provide 19.24 kg of neutralized, washed solids. These solids were pasteurized at about 72° C.

for 30 seconds and then spray dried to yield a pea protein hydrolyzate having a protein content 81.16% (N×6.25) d.b. The product was termed YP35-L07-16A YP823PN.

Example 7

This Example contains an evaluation of the solubility in water of the pulse protein hydrolyzates produced by the methods of Examples 1 to 6. Solubility was tested based on protein solubility (termed protein method, a modified version of the procedure of Morr et al., J. Food Sci. 50:1715-1718).

Sufficient protein hydrolyzate powder to supply 0.5 g of protein was weighed into a beaker and then a small amount of reverse osmosis (RO) purified water was added and the mixture stirred until a smooth paste formed. Additional water was then added to bring the volume to approximately 45 nil. The contents of the beaker were then slowly stirred for 60 minutes using a magnetic stirrer. The pH was determined immediately after dispersing the protein and was adjusted to the appropriate level (2, 3, 4, 5, 6 or 7) with diluted NaOH or HCl. A sample was also prepared at natural pH. For the pH adjusted samples, the pH was measured and corrected periodically during the 60 minutes stirring. After the 60 minutes of stirring, the samples were made up to 50 ml total volume with RO water, yielding a 1% w/v protein dispersion. The protein content of the dispersions was measured by combustion analysis using a Leco Nitrogen Determinator (N×6.25). Aliquots of the dispersions were then centrifuged at 7,800 g for 10 minutes, which sedimented insoluble material and yielded a supernatant. The protein content of the supernatant was measured by combustion analysis (N×6.25) and the protein solubility of the product calculated as follows:

Protein Solubility (%)=(% protein in supernatant/% protein in initial dispersion)×100

Values calculated as greater than 100% were reported as 100%.

The natural pH values of the hydrolyzed protein products of Examples 1 to 6 in water (1% protein) are shown in Table 1:

TABLE 1

Natural pH of pulse protein hydrolyzates in water at 1% protein

| Product | Natural pH |
| --- | --- |
| YP29-H11-16A YP820A | 3.69 |
| YP35-I19-16A YP820A | 2.89 |
| YP34-I26-16A YP820A | 3.07 |
| YP35-J06-16A YP822A | 3.65 |
| YP29-J11-16A YP822A | 3.69 |
| YP35-L07-16A YP823A | 3.76 |

The protein solubility results obtained are set forth in the following Table 2:

TABLE 2

Protein solubility of products at different pH values

| Product | Protein Solubility (%) | | | | | | |
| --- | --- | --- | --- | --- | --- | --- | --- |
| | pH 2 | pH 3 | pH 4 | pH 5 | pH 6 | pH 7 | Nat. pH |
| YP29-H11-16A YP820A | 98.1 | 100 | 100 | 100 | 100 | 100 | 100 |
| YP35-I19-16A YP820A | 100 | 100 | 100 | 100 | 100 | 95.2 | 95.0 |
| YP34-I26-16A YP820A | 100 | 100 | 93.2 | 97.2 | 98.0 | 99.0 | 100 |
| YP35-J06-16A YP822A | 92.1 | 97.3 | 100 | 100 | 100 | 100 | 100 |
| YP29-J11-16A YP822A | 100 | 98.0 | 95.0 | 91.2 | 98.0 | 99.0 | 99.0 |
| YP35-L07-16A YP823A | 100 | 100 | 100 | 100 | 98.9 | 100 | 92.9 |

As can be seen from the results presented in Table 2, the pulse protein hydrolyzates had high protein solubility across the pH range tested.

Example 8

This Example illustrates the production of pulse protein isolate according to the procedure of U.S. patent application Ser. No. 13/103,528 filed May 9, 2011 (US Patent Publication No. 2011/0274797 published Nov. 10, 2011), Ser. No. 13/556,357 filed Jul. 24, 2012 (US Patent Publication No. 2013/00189408 published Jul. 25, 2013), Ser. No. 13/642,003 filed Jan. 7, 2013 (US Patent Publication No. 2013/0129901 published May 23, 2013) and Ser. No. 15/041,193 filed Feb. 11, 2016 (US Patent Publication No. 2016/0227833 published Aug. 11, 2016 ("YP701")). As previously mentioned, pulse protein isolate prepared by this method provides an astringent sensation in the mouth when consumed in acidic solution. The product prepared according to this Example was used in sensory evaluations of astringency, as described in Examples 9-14, 18 and 19.

30 kg of yellow pea protein concentrate was combined with 300 L of 0.15 M CaCl$_2$ solution at ambient temperature and agitated for 30 minutes to provide an aqueous protein solution. The residual solids were removed by centrifugation to produce a centrate having a protein content of 2.68% by weight. 262 L of centrate was added to 274 L of RO water and the pH of the sample lowered to 2.85 with HCl solution (concentrated HCl diluted with an equal volume of water). The diluted and acidified centrate was further clarified by filtration to provide a clear protein solution with a protein content of 1.15% by weight and having a pH of 3.23.

The filtered protein solution was warmed then reduced in volume from 662 L to 57 L by concentration on a polyethersulfone membrane, having a molecular weight cutoff of 100,000 Daltons, operated at a temperature of about 49° C. The concentrated acidified protein solution, with a protein content of 9.33% by weight, was diafiltered with 285 L of RO water, with the diafiltration operation conducted at about 52° C. 50.20 kg of acidified, diafiltered, concentrated protein solution was obtained having a protein content of 7.91 wt %. The acidified, diafiltered, concentrated protein solution was then heated at about 76° C. for 16 seconds and then dried to yield a product found to have a protein content of 101.50 wt % (N×6.25) d.b. The product was termed YP35-K28-16A YP701.

Example 9

This Example illustrates a comparison of the astringency level of the YP29-H11-16A YP820A prepared as described in Example 1 with that of the YP35-K28-16A YP701 prepared as described in Example 8.

Samples were prepared for sensory evaluation by dissolving sufficient protein powder to supply 2 g protein in 100 ml of purified drinking water. The pH of the YP820A solution was 3.62. The pH of the YP701 solution was 3.56. An informal panel of 7 panellists was asked to blindly taste the samples and indicate which was less astringent.

Four out of seven panellists indicated that the YP29-H11-16A YP820A was less astringent and three panellists indicated that the YP35-K28-16A YP701 was less astringent.

Example 10

This Example illustrates a comparison of the astringency level of the YP35-I19-16A YP820A prepared as described in Example 2 with that of the YP35-K28-16A YP701 prepared as described in Example 8.

Samples were prepared for sensory evaluation by dissolving sufficient protein powder to supply 2 g protein in 100 ml of purified drinking water. The pH of the YP820A solution was 2.83. The pH of the YP701 solution was lowered from 3.45 to 2.87 by the addition of food grade HCl solution. An informal panel of 7 panellists was asked to blindly taste the samples and indicate which was less astringent.

Five out of seven panellists indicated that the YP35-I19-16A YP820A was less astringent and two panellists indicated that the YP35-K28-16A YP701 was less astringent.

Example 11

This Example illustrates a comparison of the astringency level of the YP34-I26-16A YP820A prepared as described in Example 3 with that of the YP35-K28-16A YP701 prepared as described in Example 8.

Samples were prepared for sensory evaluation by dissolving sufficient protein powder to supply 2 g protein in 100 ml of purified drinking water. The pH of the YP820A solution was 3.04. The pH of the YP701 solution was lowered from 3.69 to 3.08 by the addition of food grade HCl solution. An informal panel of 6 panellists was asked to blindly taste the samples and indicate which was less astringent.

Five out of six panellists indicated that the YP34-I26-16A YP820A was less astringent and one panelist indicated that the YP35-K28-16A YP701 was less astringent.

Example 12

This Example illustrates a comparison of the astringency level of the YP35-J06-16A YP822A prepared as described in Example 4 with that of the YP35-K28-16A YP701 prepared as described in Example 8.

Samples were prepared for sensory evaluation by dissolving sufficient protein powder to supply 2 g protein in 100 ml of purified drinking water. The pH of the YP822A solution was 3.63. The pH of the YP701 solution was 3.60. An informal panel of 6 panellists was asked to blindly taste the samples and indicate which was less astringent.

All six panellists indicated that the YP35-J06-16A YP822A was less astringent.

Example 13

This Example illustrates a comparison of the astringency level of the YP29-J11-16A YP822A prepared as described in Example 5 with that of the YP35-K28-16A YP701 prepared as described in Example 8.

Samples were prepared for sensory evaluation by dissolving sufficient protein powder to supply 3 g protein in 150 ml of purified drinking water. The pH of the YP822A solution was 3.68. The pH of the YP701 solution was 3.63. An informal panel of 10 panellists was asked to blindly taste the samples and indicate which was less astringent.

Seven out of ten panellists indicated that the YP29-J11-16A YP822A was less astringent, two panellists indicated that the YP35-K28-16A YP701 was less astringent and one panelist could not detect a difference in astringency level.

Example 14

This Example illustrates a comparison of the astringency level of the YP35-L07-16A YP823A prepared as described in Example 6 with that of the YP35-K28-16A YP701 prepared as described in Example 8.

Samples were prepared for sensory evaluation by dissolving sufficient protein powder to supply 3 g protein in 150 ml of purified drinking water. The pH of the YP823A solution was 3.75. The pH of the YP701 solution was 3.63. An informal panel of 10 panellists was asked to blindly taste the samples and indicate which was less astringent.

Eight out of ten panellists indicated that the YP35-L07-16A YP823A was less astringent, while two panellists indicated that the YP35-K28-16A YP701 was less astringent.

Example 15

This Example describes another example of the preparation of pulse protein hydrolyzates from neutral, dry powder pulse protein product according to an embodiment of the method of the present invention.

96 kg of yellow pea flour was added to 600 L of reverse osmosis purified water at ambient temperature and agitated for 10 minutes to provide an aqueous protein solution. A portion of the suspended solids were removed by centrifugation using a decanter centrifuge and a protein solution having a protein content of 2.86% by weight was collected. The pH of the protein solution was lowered to 2.04 by the addition of HCl solution (concentrated HCl diluted with an equal volume of water), the solution was warmed to 50° C., held for 10 minutes and then centrifuged using a disc stack centrifuge. 477.3 L of acidified protein solution and an unrecorded weight of acid insoluble solid material were collected.

The acidified protein solution, having a protein content of 2.46 wt %, was reduced in volume to 135 L by concentration on a microfiltration membrane having a molecular weight cut-off of 0.80 μm and operated at about 51° C. The protein solution was then further concentrated while concurrently diafiltering it with 135 L of RO water adjusted to pH 2 with HCl solution, the concentration and diafiltration being conducted at a temperature of about 52° C. A total of 576 L of microfiltration permeate (clarified, acidified protein solution) having a protein content of 1.85 wt % was collected. This solution was reduced in volume to 180 L by concentration on a polyethersulfone membrane having a molecular weight cut-off of 100,000 daltons, operated at a temperature of about 48° C. The protein solution, with a protein content of 5.31 wt %, was then diafiltered on the same membrane with 1620 L of RO water adjusted to pH 2 with HCl solution, followed by diafiltration with an additional 75 L of RO water. The diafiltration operation was conducted at about 53° C. The diafiltered protein solution, having a protein content of 5.23 wt % was then further concentrated to a protein content of 9.01 wt %. 90 L of concentrated and diafiltered protein solution was pasteurized at about 73° C. for 16 seconds and then cooled. 90 kg of the pasteurized protein solution was combined with 20 kg of RO water, filtered through a 2 μm sock filter and then sufficient NaOH/KOH solution to adjust the pH to 6.96 was added and the mixture spray dried to yield a product found to have a protein content of 87.74% (N×6.25) d.b. The product was termed YP36-B28-17A YP810N.

6.565 kg of YP36-B28-17A YP810N was mixed with 70 L of RO water at 50° C. to form a protein solution containing 5.42 kg of substrate protein. This solution had a pH of 6.84. To the sample was added 25 g of proteolytic enzyme (Protease P, Amano). The sample was held at about 50° C. and mixed for 60 minutes. The enzyme was inactivated by heat treating the solution for 20 minutes between 62° and 72° C. The treated protein solution was then cooled to room temperature. 76.18 kg of sample was obtained having a pH of 6.29 and a protein content of 7.49%.

A 19.56 kg portion of the enzyme treated material was centrifuged in the HG-4L rotor of a Sorvall RC-3 centrifuge to provide 14.56 kg of centrate (soluble fraction) and 5 kg of residual solids. The centrate had a protein content of 4.75 wt %. The centrate was pasteurized by heating to about 73° C. for 16 seconds and then cooled. The pasteurized solution was spray dried to yield a pulse protein hydrolyzate having a protein content of 90.81 wt % (N×6.25) d.b. This product was termed YP36-D20-17A YP840N. The residual solids were freeze dried to provide a pulse protein hydrolyzate having a protein content of 82.59 wt % (N×6.25) d.b. This product was termed YP36-D20-17A YP840PN.

A 46.44 kg portion of the enzyme treated material was lowered in pH to 2.94 using a solution of concentrated HCl mixed with an equal volume of RO water. The acidified sample was centrifuged using a desludger centrifuge to provide 45.24 kg of centrate (soluble fraction) and 10.90 kg of residual solids. 45.24 kg of centrate was concentrated to about 15 L on a Dow Filmtec nanofiltration membrane operated at about 26° C. 30 L of RO water adjusted to pH 3 with HCl solution was added and then the sample reconcentrated on the same membrane to about 15 L. This batchwise diafiltration was repeated four additional times. The temperature of the diafiltration increased from about 24° C. for the first diafiltration step to about 34° C. for the last diafiltration step. 16.96 kg of diafiltered and concentrated protein hydrolyzate solution was obtained having a protein content of 6.26 wt %. This protein solution was pasteurized at about 72° C. for 16 seconds. The pasteurized solution was then spray dried to yield a pea protein hydrolyzate having a protein content of 100.01% (N×6.25) d.b. The product was termed YP36-D20-17A YP820A. 634 g of residual solids were freeze dried to yield a pulse protein hydrolyzate having a protein content of 78.33% (N×6.25) d.b. The product was termed YP36-D20-17A YP820PA.

Example 16

This Example describes the preparation of pulse protein hydrolyzate from acidic, dry powder pulse protein product according to an embodiment of the method of the present invention.

96 kg of yellow pea flour was added to 600 L of reverse osmosis purified water at ambient temperature and agitated for 10 minutes to provide an aqueous protein solution. A portion of the suspended solids were removed by centrifugation using a decanter centrifuge and a protein solution having a protein content of 2.87% by weight was collected. The pH of the protein solution was lowered to 1.89 by the addition of HCl solution (concentrated HCl diluted with an equal volume of water), the solution was warmed to 50° C., held for 10 minutes and then centrifuged using a disc stack centrifuge. 482 L of acidified protein solution and an unrecorded weight of acid insoluble solid material were collected.

462 L of the acidified protein solution, having a protein content of 2.45 wt %, was reduced in volume to 180 L by concentration on a polyethersulfone membrane having a molecular weight cut-off of 100,000 daltons, operated at a temperature of about 49° C. The protein solution, with a protein content of 5.68 wt %, was then diafiltered on the same membrane with 1620 L of RO water adjusted to pH 2 with HCl solution, followed by diafiltration with an additional 180 L of RO water. The diafiltration operation was conducted at about 52° C. The diafiltered protein solution, having a protein content of 5.24 wt % was then further concentrated to a protein content of 10.20 wt %. 90 L of concentrated and diafiltered protein solution was pasteurized at about 73° C. for 16 seconds and then cooled. The pasteurized protein solution (95 L) was further diluted with about 20 L of RO water then spray dried to yield a product found to have a protein content of 89.53% (N×6.25) d.b. The product was termed YP36-I11-17A YP810A.

55.8 g of YP36-I11-17A YP810A was mixed with RO water to prepare 1000 ml of protein solution containing 48.1 g of substrate protein. The pH of the protein solution was raised from 2.83 to 3 by the addition of 2M NaOH and then the temperature of the solution raised to about 50° C. 0.25 g of Protease M (Amano) was added to the sample, which was mixed at 50° C. for 60 minutes. The enzyme was then inactivated by heating the sample to 90° C. for 10 minutes. The sample was then cooled to room temperature and centrifuged for 10 minutes at 7,000 g using a laboratory centrifuge. The centrate (soluble fraction) was discarded. The residual solids were collected and resuspended in 4 volumes of RO water adjusted to pH 3 with HCl solution. The sample was then centrifuged for 10 minutes at 7,000 g using a laboratory centrifuge, the centrate discarded and the washed residual solids collected and freeze dried. 23.40 g of freeze dried material was collected, containing a protein content of 80.79% (N×6.25) w.b. The product was termed benchscale YP821PA.

Example 17

This Example contains an evaluation of the solubility in water of the pulse protein hydrolyzates derived from the soluble fractions in the method of Example 15. Solubility was tested based on protein solubility (termed protein method, a modified version of the procedure of Morr et al., J. Food Sci. 50:1715-1718).

Sufficient protein hydrolyzate powder to supply 0.5 g of protein was weighed into a beaker and then a small amount of reverse osmosis (RO) purified water was added and the mixture stirred until a smooth paste formed. Additional water was then added to bring the volume to approximately 45 nil. The contents of the beaker were then slowly stirred for 60 minutes using a magnetic stirrer. The pH was determined immediately after dispersing the protein and was adjusted to the appropriate level (2, 3, 4, 5, 6 or 7) with diluted NaOH or HCl. A sample was also prepared at natural pH. For the pH adjusted samples, the pH was measured and corrected periodically during the 60 minutes stirring. After the 60 minutes of stirring, the samples were made up to 50 ml total volume with RO water, yielding a 1% w/v protein dispersion. The protein content of the dispersions was measured by combustion analysis using a Leco Nitrogen Determinator (N×6.25). Aliquots of the dispersions were then centrifuged at 7,800 g for 10 minutes, which sedimented insoluble material and yielded a supernatant. The protein content of the supernatant was measured by combustion analysis (N×6.25) and the protein solubility of the product calculated as follows:

Protein Solubility (%)=(% protein in supernatant/% protein in initial dispersion)×100

Values calculated as greater than 100% were reported as 100%.

The natural pH values of the pulse protein hydrolyzates of Example 15 in water (1% protein) are shown in Table 3:

TABLE 3

Natural pH of pulse protein hydrolyzates in water at 1% protein

| Product | Natural pH |
|---|---|
| YP36-D20-17A YP840N | 6.21 |
| YP36-D20-17A YP820A | 3.36 |

The protein solubility results obtained are set forth in the following Table 4:

TABLE 4

Protein solubility of products at different pH values

| | Protein Solubility (%) | | | | | | |
|---|---|---|---|---|---|---|---|
| Product | pH 2 | pH 3 | pH 4 | pH 5 | pH 6 | pH 7 | Nat. pH |
| YP36-D20-17A YP840N | 100 | 100 | 97.1 | 96.2 | 100 | 100 | 100 |
| YP36-D20-17A YP820A | 95.1 | 93.9 | 92.6 | 98.0 | 100 | 100 | 97.9 |

As can be seen from the results presented in Table 4, the enzyme hydrolyzed protein products were very soluble across the pH range tested.

Example 18

This Example illustrates a comparison of the astringency level of the YP36-D20-17A YP840N prepared as described in Example 15 with that of the YP35-K28-16A YP701 prepared as described in Example 8.

Samples were prepared for sensory evaluation by dissolving sufficient protein powder to supply 2 g protein in 100 ml of purified drinking water. The pH of the YP701 solution was 3.39. The pH of the YP840N solution was lowered from 6.25 to 3.41 by the addition of food grade HCl solution. An informal panel of panellists was asked to blindly taste the samples and indicate which was less astringent.

Five out of seven panelists indicated that the YP36-D20-17A YP840N was less astringent, while two panelists indicated that the YP35-K28-16A YP701 was less astringent.

Example 19

This Example illustrates a comparison of the astringency level of the YP36-D20-17A YP820A prepared as described in Example 15 with that of the YP35-K28-16A YP701 prepared as described in Example 8.

Samples were prepared for sensory evaluation by dissolving sufficient protein powder to supply 2 g protein in 100 ml of purified drinking water. The pH of the YP820A solution was 3.23. The pH of the YP701 solution was 3.34. An informal panel of 7 panellists was asked to blindly taste the samples and indicate which was less astringent.

Five out of seven panelists indicated that the YP36-D20-17A YP840N was less astringent, while two panelists indicated that the YP35-K28-16A YP701 was less astringent.

Example 20

This Example describes the Amino Acid Score of products derived from the residual solids after enzyme treatment compared to the substrate material.

The reference amino acid pattern used to determine the Amino Acid Scores was the FAO/WHO/UNU 1985 (Report of Joint FAO/WHO/UNU Expert Consultation (1985) Energy and Protein Requirements, WHO Technical Report Series 724) pattern for children 2-5 (Report of Joint FAO/WHO Expert Consultation (1991) Protein Quality Evaluation, FAO Food and Nutrition Paper 51). This pattern is shown in Table 5.

TABLE 5

Reference essential amino acid pattern used to calculate Amino Acid Scores

| Essential amino acid(s) | Concentration (mg/g protein) |
|---|---|
| Histidine | 19 |
| Isoleucine | 28 |
| Leucine | 66 |
| Lysine | 58 |
| Methionine + Cystine | 25 |
| Phenylalanine + Tyrosine | 63 |
| Threonine | 34 |
| Tryptophan | 11 |
| Valine | 35 |

Amino Acid Score is calculated by dividing the content of each essential amino acid (mg/g protein) in the test protein by the content of the same essential amino acid in the reference pattern (mg/g protein). The lowest resulting value, obtained for the most limiting essential amino acid, is considered the Amino Acid Score (AAS) (Report of Joint FAO/WHO Expert Consultation (1991) Protein Quality Evaluation, FAO Food and Nutrition Paper 51; Schaarfsma, G. 2000. J. Nutr., 130: 1865S).

Amino acid profiles of the pulse protein hydrolyzates derived from the residual, enzyme treated solids in Examples 2, 5, 6, 15 and 16 as well as the dry pulse protein substrates used in Examples 2, 15 and 16 were assessed experimentally. A complete amino acid profile analysis was done, to quantify tryptophan, cysteine/methionine and the remaining amino acids.

Essential amino acid profiles and calculated Amino Acid Scores for the substrates and the pulse protein hydrolyzates derived from the residual solids are shown in Tables 6 to 10 below.

TABLE 6

Essential amino acid profiles and Amino Acid Scores for substrate and residual solids derived pulse protein hydrolyzate of Example 2

| Essential amino acid(s) | YP35-G19-16A YP810N | | YP29-I19-16A YP820PN | |
|---|---|---|---|---|
| | Concentration (mg/g protein) | Conc./reference conc. | Concentration (mg/g protein) | Conc./reference conc. |
| Histidine | 25.80 | 1.36 | 24.79 | 1.30 |
| Isoleucine | 46.64 | 1.67 | 63.80 | 2.28 |
| Leucine | 76.56 | 1.16 | 100.86 | 1.53 |
| Lysine | 85.51 | 1.47 | 74.72 | 1.29 |
| Methionine + Cystine | 19.35 | 0.77 | 26.42 | 1.06 |
| Phenylalanine + Tyrosine | 91.17 | 1.45 | 127.73 | 2.03 |
| Threonine | 45.82 | 1.35 | 48.59 | 1.43 |
| Tryptophan | 8.96 | 0.81 | 15.46 | 1.41 |
| Valine | 49.59 | 1.42 | 64.05 | 1.83 |
| | AAS | 0.77 | AAS | 1.06 |

TABLE 7

Essential amino acid profile and Amino Acid Score for residual solids derived pulse protein hydrolyzate of Example 5

| Essential amino acid(s) | YP35-J11-16A YP822PN | |
|---|---|---|
| | Concentration (mg/g protein) | Conc./reference value |
| Histidine | 26.45 | 1.39 |
| Isoleucine | 60.66 | 2.17 |
| Leucine | 102.76 | 1.56 |
| Lysine | 82.24 | 1.42 |
| Methionine + Cystine | 24.89 | 1.00 |
| Phenylalanine + Tyrosine | 122.63 | 1.95 |
| Threonine | 45.00 | 1.32 |
| Tryptophan | 12.51 | 1.14 |
| Valine | 59.21 | 1.69 |
| | AAS | 1.00 |

TABLE 8

Essential amino acid profile and Amino Acid Score for residual solids derived pulse protein hydrolyzate of Example 6

| Essential amino acid(s) | YP35-L07-16A YP823PN | |
|---|---|---|
| | Concentration (mg/g protein) | Conc./reference value |
| Histidine | 23.55 | 1.24 |
| Isoleucine | 56.71 | 2.03 |
| Leucine | 92.50 | 1.40 |
| Lysine | 75.00 | 1.29 |
| Methionine + Cystine | 24.62 | 0.98 |
| Phenylalanine + Tyrosine | 108.42 | 1.72 |
| Threonine | 41.97 | 1.23 |
| Tryptophan | 11.08 | 1.01 |
| Valine | 57.63 | 1.65 |
| | AAS | 0.98 |

TABLE 9

Essential amino acid profiles and Amino Acid Scores for substrate and residual solids derived pulse protein hydrolyzates of Example 15

| Essential amino acid(s) | YP36-B28-17A YP810N | | YP36-D20-17A YP820PA | | YP36-D20-17A YP840PN | |
|---|---|---|---|---|---|---|
| | Conc. (mg/g protein) | Conc./ref. value | Conc. (mg/g protein) | Conc./ref. value | Conc. (mg/g protein) | Conc./ref. value |
| Histidine | 26.00 | 1.37 | 25.39 | 1.34 | 25.03 | 1.32 |
| Isoleucine | 46.67 | 1.67 | 53.26 | 1.90 | 54.33 | 1.94 |
| Leucine | 79.44 | 1.20 | 85.94 | 1.30 | 89.13 | 1.35 |
| Lysine | 81.86 | 1.41 | 75.65 | 1.30 | 75.09 | 1.29 |
| Methionine + Cystine | 20.47 | 0.82 | 25.13 | 1.01 | 24.93 | 1.00 |
| Phenylalanine + Tyrosine | 92.63 | 1.47 | 107.30 | 1.70 | 110.01 | 1.75 |
| Threonine | 43.29 | 1.27 | 42.71 | 1.26 | 44.20 | 1.30 |
| Tryptophan | 8.75 | 0.80 | 12.28 | 1.12 | 12.21 | 1.11 |
| Valine | 49.46 | 1.41 | 55.47 | 1.58 | 56.41 | 1.61 |
| | AAS | 0.80 | AAS | 1.01 | AAS | 1.00 |

TABLE 10

Essential amino acid profiles and Amino Acid Scores for substrate and residual solids derived pulse protein hydrolyzate of Example 16

| Essential amino acid(s) | YP36-I11-17A YP810A | | benchscale YP821PA | |
|---|---|---|---|---|
| | Concentration (mg/g protein) | Conc./reference conc. | Concentration (mg/g protein) | Conc./reference conc. |
| Histidine | 25.75 | 1.36 | 23.82 | 1.25 |
| Isoleucine | 45.36 | 1.62 | 57.23 | 2.04 |
| Leucine | 77.84 | 1.18 | 93.02 | 1.41 |
| Lysine | 80.28 | 1.38 | 70.45 | 1.21 |
| Methionine + Cystine | 21.99 | 0.88 | 24.71 | 0.99 |
| Phenylalanine + Tyrosine | 91.54 | 1.45 | 108.85 | 1.73 |
| Threonine | 42.92 | 1.26 | 43.02 | 1.27 |
| Tryptophan | 9.15 | 0.83 | 10.65 | 0.97 |
| Valine | 49.07 | 1.40 | 57.11 | 1.63 |
| | AAS | 0.83 | AAS | 0.97 |

As may be seen from the results in Tables 6 to 10, the pulse protein hydrolyzates prepared from the residual solids after enzyme treatment had Amino Acid Scores in the range of 0.97-1.06. This was an improvement on the Amino Acid Scores of the substrate proteins, which were in the range of 0.77-0.83.

Example 21

This Example illustrates the molecular weight profile of the pulse protein hydrolyzates derived from the soluble fraction in Examples 1-6 and 15.

Molecular weight profiles were determined by size exclusion chromatography using a Varian ProStar HPLC system equipped with a 300×7.8 mm Phenomenex Yana SEC-2000 series column. The column contained hydrophilic bonded silica rigid support media, 3 micron diameter, with 145 Angstrom pore size.

A standard curve was prepared using a Biorad gel filtration standard (Biorad product #151-1901) containing proteins with known molecular weights between 17,000 Daltons (myoglobulin) and 670,000 Daltons (thyroglobulin) with Vitamin B12 added as a low molecular weight marker at 1,350 Daltons. A 0.9% w/v solution of the gel filtration standard was prepared in running buffer (0.05M phosphate/

0.15M NaCl, pH 6 containing 0.02% sodium azide), filtered with a 0.45 μm pore size filter disc then a 25 μL aliquot run on the column using a mobile phase of 0.05M phosphate/ 0.15M NaCl, pH 6 containing 0.02% sodium azide. The mobile phase flow rate was 1 mL/min and components were detected based on absorbance at 214 nm. Based on the retention times of these molecules of known molecular weight, a regression formula was developed relating the natural log of the molecular weight to the retention time in minutes.

For the analysis of the pulse protein hydrolyzate samples, 0.05M phosphate/0.15M NaCl, pH 6 containing 0.02% sodium azide was used as the mobile phase and also to dissolve dry samples. Protein hydrolyzate samples were mixed with mobile phase solution to a concentration of 1% w/v, placed on a shaker for at least 1 hour then filtered using 0.45 μm pore size filter discs. Sample injection size was 100 μL. The mobile phase flow rate was 1 mL/minute and components were detected based on absorbance at 214 nm.

The regression formula relating molecular weight and retention time was used to calculate retention times that corresponded to molecular weights of 100,000 Da, 15,000 Da, 5,000 Da and 1,000 Da. The HPLC ProStar system was used to calculate the peak areas within these retention time ranges and the percentage of material ((range peak area/sum of all range peak areas)×100) falling in a given molecular weight range was calculated.

The molecular weight profiles of the pulse protein hydrolyzates are shown in the Table below.

TABLE 11

Molecular weight profiles of soluble fraction derived pulse protein hydrolyzates

| Product | % >100,000 Da | % 15,000-100,000 Da | % 5,000-15,000 Da | % 1,000-5,000 Da | % <1,000 Da |
|---|---|---|---|---|---|
| YP29-H11-16A YP820A | 8 | 27 | 20 | 32 | 14 |
| YP35-I19-16A YP820A | 0 | 4 | 27 | 54 | 15 |
| YP34-I26-16A YP820A | 0 | 8 | 25 | 50 | 17 |
| YP35-J06-16A YP822A | 14 | 30 | 21 | 27 | 8 |
| YP35-J11-16A YP822A | 2 | 22 | 29 | 37 | 11 |
| YP35-L07-16A YP823A | 2 | 4 | 21 | 51 | 23 |
| YP36-D20-17A YP840N | 1 | 8 | 24 | 48 | 20 |
| YP36-D20-17A YP820A | 1 | 9 | 25 | 47 | 17 |

As may be seen from the results of Table 11, the profiles of all samples indicated the presence of some larger molecular weight material.

SUMMARY OF THE DISCLOSURE

In summary of this disclosure, the present invention is concerned with the preparation of pulse protein hydrolyzates involving hydrolysis of the starting pulse protein product, optional pH adjustment and separation of the resulting material. The soluble portion after enzyme hydrolysis and separation is further processed to provide a low astringent, acid soluble pulse protein hydrolyzate. The residual solids after the enzyme hydrolysis and separation are further processed to provide a pulse protein hydrolyzate with an improved Amino Acid Score compared to the substrate pulse protein. Modifications are possible within the scope of this invention.

The invention claimed is:
1. A method of processing a pulse protein material, which comprises:
   a) rehydrating dry powder pulse protein product, having a protein content of at least about 60 wt % (N×6.25) on a dry weight basis (d.b.) and a natural pH in aqueous solution of about 6.0 to about 8.0, to provide a pulse protein solution,
   b) optionally adjusting the pulse protein solution in pH within the range of about 6.0 to about 8.0,
   c) treating the optionally pH adjusted pulse protein solution with a proteolytic enzyme to effect hydrolysis of the pulse protein, and
   di1) the hydrolyzed pulse protein material is heat treated to inactivate the enzyme, and
   ei1) the pH of the heat treated hydrolyzed pulse protein material is adjusted to an acid pH value, or, alternatively to di1) and ei1):
   di2) the pH of the hydrolyzed pulse protein material is adjusted to an acid pH value, and
   ei2) the acidified hydrolyzed pulse protein material is heat treated to inactivate the enzyme,
   fi) separating the hydrolyzed pulse protein material by centrifugation to form a soluble fraction and residual solids,
   gi) concentrating and optionally diafiltering the soluble fraction to decrease the content of salt and/or other impurities in the soluble fraction and provide a first pulse protein hydrolyzate (retentate), having a protein content of at least about 60 wt % (N×6.25) on a dry weight basis, which is substantially completely soluble throughout the pH range of about 2 to about 7 and which provides a lower astringency than the pulse protein material YP35-K28-16A YP701 when an acidic beverage containing the first pulse protein hydrolyzate is consumed,
   hi) drying the concentrated and optionally diafiltered first pulse protein hydrolyzate (retentate),
   ii) washing the residual solids to provide a second pulse protein hydrolyzate having a protein content of at least about 60 wt % (N×6.25) d.b. and an improved Amino Acid Score, which is improved compared to the pulse protein material, wherein the washing is effected by mixing the residual solids with water and collecting the washed residual solids by centrifugation, and
   ji) drying the washed residual solids, or
   dii) the hydrolyzed pulse protein material is heat treated to inactivate the enzyme,
   eii) separating the hydrolyzed pulse protein material by centrifugation to form a soluble fraction and residual solids,
   fii) concentrating and optionally diafiltering the soluble fraction to decrease the content of salt and/or other impurities in the soluble fraction and provide a first pulse protein hydrolyzate (retentate), having a protein content of at least about 60 wt % (N×6.25) on a dry weight basis, which is substantially completely soluble throughout the pH range of about 2 to about 7 and which provides a lower astringency than the pulse protein material YP35-K28-16A YP701 when an acidic beverage containing the first pulse protein hydrolyzate is consumed, gii) drying the concentrated and optionally diafiltered first pulse protein hydrolyzate (retentate), hii) washing the residual solids to provide a second pulse protein hydrolyzate having a protein content of at least about 60 wt % (N×6.25) d.b. and an improved Amino Acid Score, which is improved compared to the pulse protein material, wherein the washing is effected by mixing the residual solids with water and collecting the washed residual solids by centrifugation, and iii) drying the washed residual solids.

2. The method of claim 1 wherein the washed residual solids prepared in step ii) are adjusted in pH to a pH of about 6.0 to about 8.0 prior to drying step ji), or the residual solids are neutralized during the washing step ii) by adjusting the mixture of residual solids and water to a pH of about 6.0 to about 8.0 using a food grade alkaline solution and then collecting the washed residual solids by centrifugation.

3. The method of claim 1, wherein the first pulse protein hydrolyzate of step gi) or step fii) provides no astringency in acidic solution.

4. A method of processing a pulse protein material, which comprises:

a) rehydrating dry powder pulse protein product, having a protein content of at least about 60 wt % (N×6.25) on a dry weight basis (d.b.) and a natural pH in aqueous solution of about 1.5 to about 4.0, to provide a pulse protein solution, bi) adjusting the pulse protein solution in pH within the range of about 6.0 to about 8.0, ci) treating the pH adjusted pulse protein solution with a proteolytic enzyme to effect hydrolysis of the pulse protein, and di1) the hydrolyzed pulse protein material is heat treated to inactivate the enzyme, and ei1) the pH of the heat treated hydrolyzed pulse protein material is adjusted to an acid pH value, or, alternatively to di1) and ei1):

di2) the pH of the hydrolyzed pulse protein material is adjusted to an acid pH value, and ei2) the acidified hydrolyzed pulse protein material is heat treated to inactivate the enzyme, fi) separating the hydrolyzed pulse protein material by centrifugation to form a soluble fraction and residual solids, gi) concentrating and optionally diafiltering the soluble fraction to decrease the content of salt and/or other impurities in the soluble fraction and provide a first pulse protein hydrolyzate (retentate), having a protein content of at least about 60 wt % (N×6.25) on a dry weight basis, which is substantially completely soluble throughout the pH range of about 2 to about 7 and which provides a lower astringency than the pulse protein material YP35-K28-16A YP701 when an acidic beverage containing the first pulse protein hydrolyzate is consumed, hi) drying the concentrated and optionally diafiltered first pulse protein hydrolyzate (retentate), ii) washing the residual solids to provide a second pulse protein hydrolyzate having a protein content of at least about 60 wt % (N×6.25) d.b. and an improved Amino Acid Score, which is improved compared to the pulse protein material, wherein the washing is effected by mixing the residual solids with water and collecting the washed residual solids by centrifugation, and ji) drying the washed residual solids, or bii) adjusting the pulse protein solution in pH within the range of about 6.0 to about 8.0, cii) treating the pH adjusted pulse protein solution with a proteolytic enzyme to effect hydrolysis of the pulse protein, dii) the hydrolyzed pulse protein material is heat treated to inactivate the enzyme, eii) separating the hydrolyzed pulse protein material by centrifugation to form a soluble fraction and residual solids, fii) concentrating and optionally diafiltering the soluble fraction to decrease the content of salt and/or other impurities in the soluble fraction and provide a first pulse protein hydrolyzate (retentate), having a protein content of at least about 60 wt % (N×6.25) on a dry weight basis, which is substantially completely soluble throughout the pH range of about 2 to about 7 and which provides a lower astringency than the pulse protein material YP35-K28-16A YP701 when an acidic beverage containing the first pulse protein hydrolyzate is consumed, gii) drying the concentrated and optionally diafiltered first pulse protein hydrolyzate (retentate), hii) washing the residual solids to provide a second pulse protein hydrolyzate having a protein content of at least about 60 wt % (N×6.25) d.b. and an improved Amino Acid Score, which is improved compared to the pulse protein material, wherein the washing is effected by mixing the residual solids with water and collecting the washed residual solids by centrifugation, and iii) drying the washed residual solids, or biii) optionally adjusting the pulse protein solution in pH within the range of about 1.5 to about 4.0, ciii) treating the optionally pH adjusted pulse protein solution with a proteolytic enzyme to effect hydrolysis of the pulse protein, diii) the hydrolyzed pulse protein material is heat treated to inactivate the enzyme, eiii) separating the hydrolyzed pulse protein material by centrifugation to form a soluble fraction and residual solids, fiii) concentrating and optionally diafiltering the soluble fraction to decrease the content of salt and/or other impurities in the soluble fraction and provide a first pulse protein hydrolyzate (retentate), having a protein content of at least about 60 wt % (N×6.25) on a dry weight basis, which is substantially completely soluble throughout the pH range of about 2 to about 7 and which provides a lower astringency than the pulse protein material YP35-K28-16A YP701 when an acidic beverage containing the first pulse protein hydrolyzate is consumed, giii) drying the concentrated and optionally diafiltered first pulse protein hydrolyzate (retentate), hiii) washing the residual solids to provide a second pulse protein hydrolyzate having a protein content of at least about 60 wt % (N×6.25) d.b. and an improved Amino Acid Score, which is improved compared to the pulse protein material, wherein the washing is effected by mixing the residual solids with water and collecting the washed residual solids by centrifugation, and iiii) drying the washed residual solids.

5. The method of claim 4 wherein the washed residual solids prepared in step ii) or step hiii) are adjusted in pH to a pH of about 6.0 to about 8.0 prior to drying step ji) or iiii), or the residual solids are neutralized during the washing step ii) or hiii) by adjusting the mixture of residual solids and water to a pH of about 6.0 to about 8.0 using a food grade alkaline solution and then collecting the washed residual solids by centrifugation.

6. The method of claim 4, wherein the first pulse protein hydrolyzate of step gi) or
step fii) or step fiii) provides no astringency in acidic solution.

7. A method of processing a pulse protein material, which comprises:
- a) extracting a pulse protein source with water to form an aqueous pulse protein solution,
- b) at least partially separating the aqueous pulse protein solution from residual pulse protein source,
- c) adjusting the pH of the aqueous pulse protein solution to a pH of about 1.5 to about 3.4 to solubilize the bulk of the protein and form an acidified pulse protein solution,
- d) separating the acidified pulse protein solution from the acid insoluble solid material,
- e) optionally concentrating, diafiltering and diluting the acidified pulse protein solution,
- fi) adjusting the optionally concentrated, diafiltered and diluted pulse protein solution in pH within the range of about 6.0 to about 8.0,
- gi) treating the pH adjusted pulse protein solution with a proteolytic enzyme to effect hydrolysis of the pulse protein, and
- hi1) the hydrolyzed pulse protein material is heat treated to inactivate the enzyme, and
- ii1) the pH of the heat treated hydrolyzed pulse protein material is adjusted to an acid pH value, or, alternatively to hi1) and ii1):
- hi2) the pH of the hydrolyzed pulse protein material is adjusted to an acid pH value, and
- ii2) the acidified hydrolyzed pulse protein material is heat treated to inactivate the enzyme,
- ji) separating the hydrolyzed pulse protein material by centrifugation to form a soluble fraction and residual solids,
- ki) concentrating and optionally diafiltering the soluble fraction to decrease the content of salt and/or other impurities in the soluble fraction and provide a first pulse protein hydrolyzate (retentate), having a protein content of at least about 60 wt % (N×6.25) on a dry weight basis, which is substantially completely soluble throughout the pH range of about 2 to about 7 and which provides a lower astringency than the pulse protein material YP35-K28-16A YP701 when an acidic beverage containing the first pulse protein hydrolyzate is consumed,
- li) drying the concentrated and optionally diafiltered first pulse protein hydrolyzate (retentate),
- mi) washing the residual solids to provide a second pulse protein hydrolyzate having a protein content of at least about 60 wt % (N×6.25) d.b. and an improved Amino Acid Score, which is improved compared to the pulse protein material, wherein the washing is effected by mixing the residual solids with water and collecting the washed residual solids by centrifugation, and
- ni) drying the washed residual solids, or
- fii) adjusting the optionally concentrated, diafiltered and diluted pulse protein pulse protein solution in pH within the range of about 6.0 to about 8.0,
- gii) treating the pH adjusted pulse protein solution with a proteolytic enzyme to effect hydrolysis of the pulse protein,
- hii) the hydrolyzed pulse protein material is heat treated to inactivate the enzyme,
- iii) separating the hydrolyzed pulse protein material by centrifugation to form a soluble fraction and residual solids,
- jii) concentrating and optionally diafiltering the soluble fraction to decrease the content of salt and/or other impurities in the soluble fraction and provide a first pulse protein hydrolyzate (retentate), having a protein content of at least about 60 wt % (N×6.25) on a dry weight basis, which is substantially completely soluble throughout the pH range of about 2 to about 7 and which provides a lower astringency than the pulse protein material YP35-K28-16A YP701 when an acidic beverage containing the first pulse protein hydrolyzate is consumed,
- kii) drying the concentrated and optionally diafiltered first pulse protein hydrolyzate (retentate),
- lii) washing the residual solids to provide a second pulse protein hydrolyzate having a protein content of at least about 60 wt % (N×6.25) d.b. and an improved Amino Acid Score, which is improved compared to the pulse protein material, wherein the washing is effected by mixing the residual solids with water and collecting the washed residual solids by centrifugation, and
- iii) drying the washed residual solids, or
- fiii) optionally adjusting the optionally concentrated, diafiltered and diluted pulse protein solution in pH within the range of about 1.5 to about 4.0,
- giii) treating the optionally pH adjusted pulse protein solution with a proteolytic enzyme to effect hydrolysis of the pulse protein,
- hiii) the hydrolyzed pulse protein material is heat treated to inactivate the enzyme,
- iiii) separating the hydrolyzed pulse protein material by centrifugation to form a soluble fraction and residual solids,
- jiii) concentrating and optionally diafiltering the soluble fraction to decrease the content of salt and/or other impurities in the soluble fraction and provide a first pulse protein hydrolyzate (retentate), having a protein content of at least about 60 wt % (N×6.25) on a dry weight basis, which is substantially completely soluble throughout the pH range of about 2 to about 7 and which provides a lower astringency than the pulse protein material YP35-K28-16A YP701 when an acidic beverage containing the first pulse protein hydrolyzate is consumed,
- kiii) drying the concentrated and optionally diafiltered first pulse protein hydrolyzate (retentate),
- liii) washing the residual solids to provide a second pulse protein hydrolyzate having a protein content of at least about 60 wt % (N×6.25) d.b. and an improved Amino Acid Score, which is improved compared to the pulse protein material, wherein the washing is effected by mixing the residual solids with water and collecting the washed residual solids by centrifugation, and
- miii) drying the washed residual solids.

8. The method of claim 7 wherein the washed residual solids prepared in step mi) or step liii) are adjusted in pH to a pH of about 6.0 to about 8.0 prior to drying step ni) or miii), or the residual solids are neutralized during the washing step mi) or liii) by adjusting the mixture of residual solids and water to a pH of about 6.0 to about 8.0 using a food grade alkaline solution and then collecting the washed residual solids by centrifugation.

9. The method of claim 7, wherein the first pulse protein hydrolyzate of step gi) or
step fii) or step fiii) provides no astringency in acidic solution.

* * * * *